United States Patent [19]

Drexler

[11] Patent Number: 4,614,319

[45] Date of Patent: Sep. 30, 1986

[54] SOLAR SAIL

[76] Inventor: Kim E. Drexler, 86 Renato Ct. #10, Redwood City, Calif. 94061

[21] Appl. No.: 146,700

[22] Filed: May 5, 1980

[51] Int. Cl.$^4$ .............................. B64G 1/40; B64G 1/42
[52] U.S. Cl. ................................ 244/172; 244/158 R; 244/173
[58] Field of Search .................. 244/158 R, 159, 173, 244/168, 172, 170

[56] References Cited

U.S. PATENT DOCUMENTS

| | | | |
|---|---|---|---|
| 3,116,035 | 12/1963 | Cutler | 244/168 |
| 3,144,219 | 8/1964 | Schnitzler | 244/159 |
| 3,339,863 | 9/1967 | Webb | 244/173 |
| 4,030,102 | 6/1977 | Kaplan et al. | 244/173 |

OTHER PUBLICATIONS

Garwin, *Jet Propulsion*, vol. 28, pp. 188–190.
Cotter, Sandia Research Colloquium, SCR-78, 4-1959.
Clarke, "The Wind from the Sun," 1973.
Villers, Masters Thesis, Jan. 1960.
Lippman, NASA-CR-1969, 1972.
MacNeal, NASA-CR-1329, 1969.
Drexler, "Solar Sailing", *Space Colonies,* Penguin Book, 1977.
Ratz et al, "Structural and Assembly Concepts from Large Erectable Space Sys.", vol. 36, Part 1, *Industrialization of Space,* 1978, pp. 101–113.
Muller, "In Orbit Manufacture of Solar Reflector Satellites", vol. 36, Part I, *Industrialization of Space,* 1978, pp. 415–428.

*Primary Examiner*—Galen L. Barefoot
*Attorney, Agent, or Firm*—Dula, Shields & Egbert

[57] ABSTRACT

A solar sail propulsion system comprising a solar sail for intercepting light pressure; a tension truss having two ends attached to one end of the solar sail; and a payload attached to the other end of the tension truss. The solar sail is a thin metal film. The tension truss comprises a plurality of attachment sections for attaching shroud lines to the top of the tension truss. The shroud lines are attached to the attachment section at one of their ends and to the payload at the other. A plurality of reels are attached to the shroud lines. The sail is a disc attached to a truss built of tension structures with catenary-edged panels installed in apertures in the disk structures. The sail is made of several layers of different materials.

2 Claims, 11 Drawing Figures

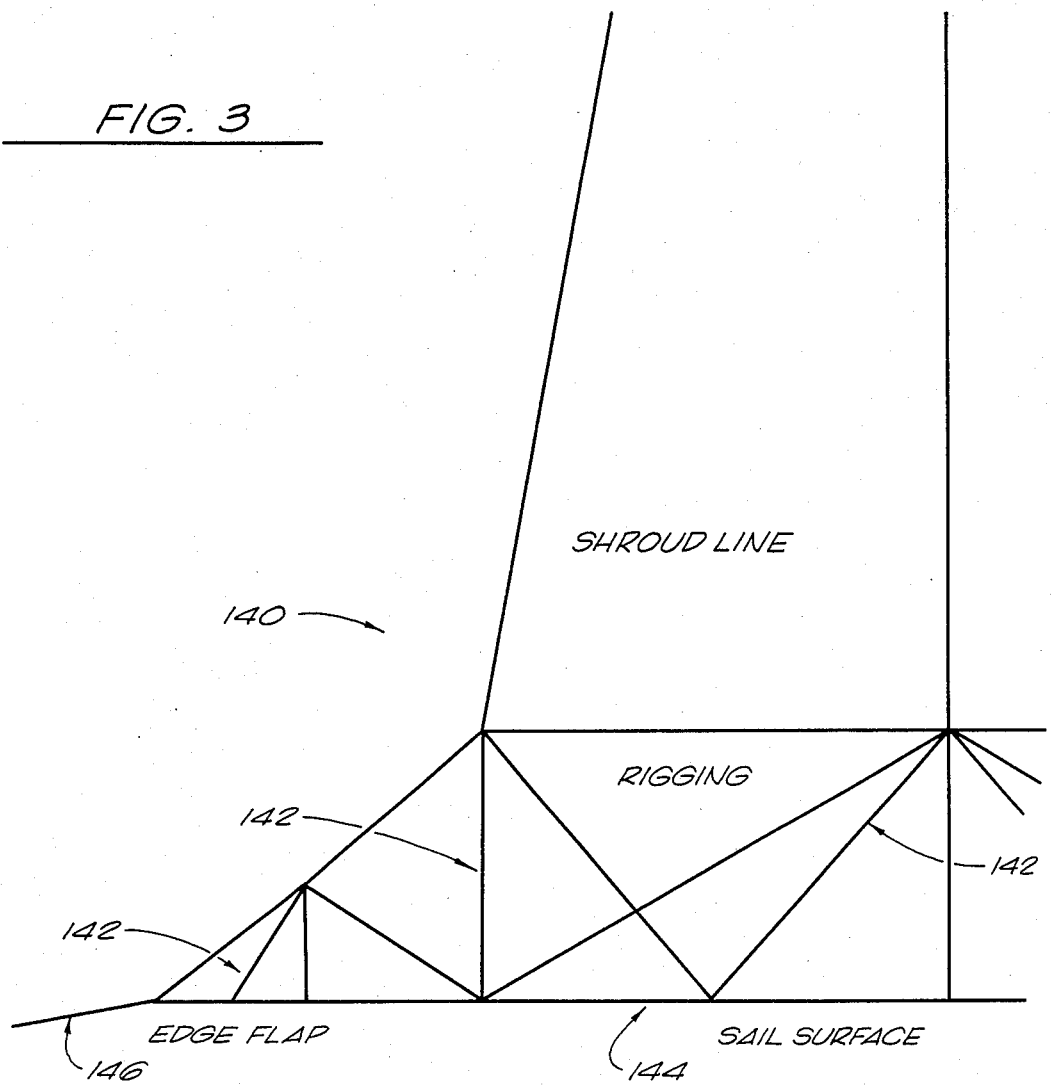

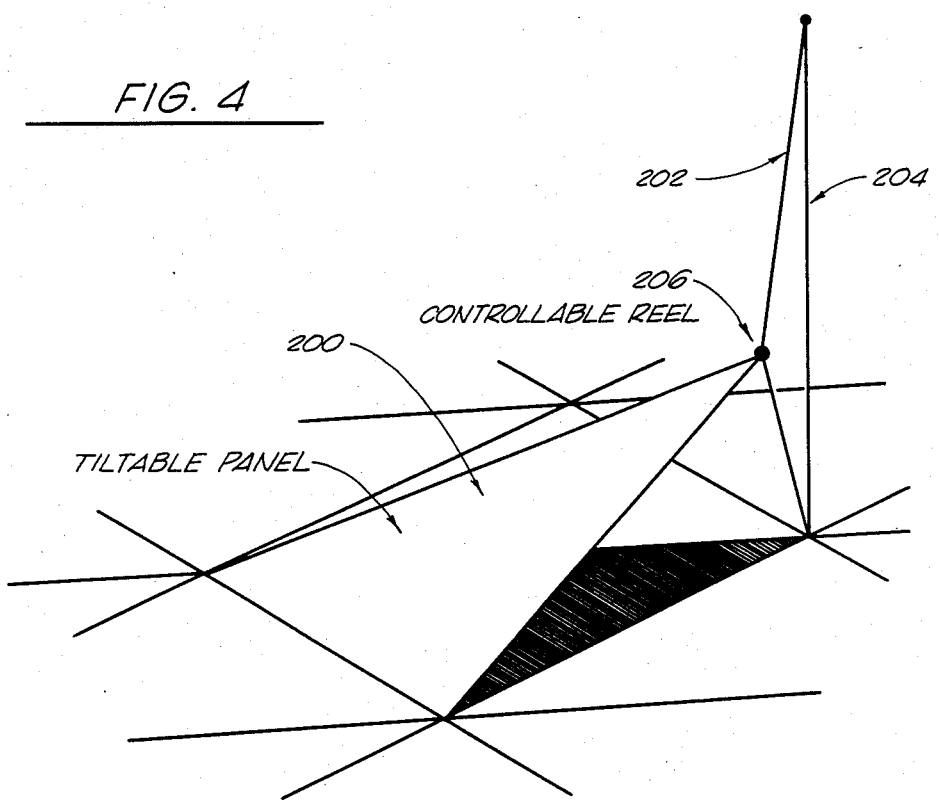

SOLAR SAIL

TECHNICAL FIELD

The present invention relates to apparatus for facilitating movement in outer space. More particularly, the present invention relates to solar sails. In addition, the present invention pertains to methods of production of thin film foruse in solar sails.

BACKGROUND ART

English language references to spacecraft propelled by solar radiation pressure date back to Carl Wiley's "Clipper Ships of Space" in the May, 1951 issue of Astounding Science Fiction. This article describes the sail made in space of thin metal film and connected to the payload by means of shrouds. It differs from the present invention in several respects. The proposed means of substrate removal involved electrostatic stripping of a molten plastic, rather than use of a subliming material. In addition, the sail itself was of the parachute type rather than a spinning disc.

The earliest English technical proposal, by R. L. Garwin, in Jet Propulsion, Volume 28, pp. 188–90, proposed a deployable plastic film sail, also a parachute type. In April of 1959, Cotter in the Sandia Research Colloquium, S.C.R.-78, proposed a variety of sail designs, including a spinning disc. It differed from the present invention by incorporating stiffening ribs to couple torques, applied to the hub, to the disc of the sail. It also incorporated a counterspun payload to torque against, rather than utilizing shift of the center of gravity or the center of light pressure to supply torque.

In May of 1973, A. C. Clarke wrote a story entitled "The Wind from the Sun," in which a solar-sailing yacht is mentioned which is of the spining disc type. Its connection to the payload is implied to be by means of shroud line, resembling the present invention in this respect. However, this invention had shroud lines connected directly to the sail surface, rather to an intermediate tension truss. No control mode was suggested for the vehicle.

In his Master's Thesis of January, 1960, P. Villers describes a variety of sail concepts. One concept includes panels in stringers in the construction. The panels differ from those of the present invention by being attached to the tension members ("stringers") around their entire peripheries, thereby subjecting them to difficulties involving maintenance of proper tension and flatness under varying load and thermal conditions. He discussed spinning disc sails, with the payload mounted at the center rather than on the shroud. He also discusses precession of the sail by means of payload offset but attempts to achieve this by means of a despun arm extending from the hub.

In 1972, M. E. Lippman (NASA-C.R.-1969) proposed the in-space fabrication of thin metal films for use in solar sails. His proposal differs from the present invention by the stripping of the vapor deposited film directly from a metal cylinder or belt, with no use of a sublimable or evaporable parting layer. Experiments produced aluminum sheets hundreds of times thicker than those expected with the present invention. Deposition of sheets of varying thickness, thereby incorporating ribs of thicker material, was proposed as a means of rendering the sheet more tear resistant.

In the mid-1960's, R. H. MacNeal developed the heliogyro sail concept summarized in NASA-C.R. 1329 (June, 1969). While the heliogyro was a centrifically tensioned design, it involves long narrow blades extending from a hub, rather than a spinning disc. This is structurally and concepturally quite different from the present invention.

In July of 1976, the Jet Propulsion Laboratories produced a set of working papers that described the set of concepts they considered viable for a solar sailing mission. These included the heliogyro, a variety of sails incorporating kite-like or hoop-like compression members for tensioning, and electrostatically tensioned sail, and a structureless spinning disc sail maneuvered by offsetting the payload on a despun arm. No consideration was given to sails manufactured or assembled in space, like those of the present invention.

Hass in Volume 7 of Physics of Thin Films (1973), describes many techniques for fabrication of thinned unbacked films, including deposition of metals onto solid or liquid substrates, followed by substrate or parting layer dissolution in a solvent. In some processes, the substrate (or, equivalently, a parting layer on the substrate) was formed by vapor deposition. These processes differ from the present invention in that the substrate or parting layer is not removed by sublimation, and is not recycled.

The present inventor, in "Solar Sailing," of Space Colonies, Penquin Books, 1977, mentions some of his early ideas for high performance solar sails in the context of a popular article. The ideal of depositing a metal film on a substrate of sublimable wax with a subsequent recovery of the wax is mentioned, but no practical embodiment of this idea is presented. The preferred version of the present invention differs in not needing a wax as the substrate.

It is an object of the present invention to provide a method of fabrication of thin film reflecting elements in space which makes feasible solar sails with twenty to eighty times the thrust-to-mass ratio of previous sails.

It is another object of the present invention to provide a method for the production of high performance solar sails.

It is still another object of the present invention to provide a solar sail that offers performance characteristics not found in previously devised or conceptualized solar sails.

These and other objects and advantages of the present invention will become apparent from a reading of the attached specification and appended Claims.

DISCLOSURE OF THE INVENTION

The present invention is a solar sail propulsion system comprising: a sail for intercepting light pressure for producing thrust; a tension truss having two ends attached at one end to the sail for transfering the thrust from the sail and for preventing deformation of the sail under light pressure; and a payload attached to the other end of the tension truss. The solar sail is a thin metal film. The tension truss includes a plurality of attachment sections for connecting shroud lines to the top of the tension truss, and a plurality of shroud lines attached to the attachment section at one of their ends and to the payload at the other end. A plurality of reels are attached to the shroud lines for controllably varying the length of the lines. A plurality of reflective panels are attached to the sail for controlling the orientation of the system. The system further includes light-weight compression sections for preventing the collapse of the tension truss in the absence of light pressure acting on the sail. The system still further includes two-dimensional stress relief members for reducing stress across the sail. The sail is a disc attached to a truss built of tension structures with catenary-edged panels installed in appertures in the disc structures. The sail is made up of several layers of different materials.

The present invention is also a method of making a thin film comprising: coating a relatively thick surface with a volatile substance, depositing a film on the volatile substance, and volatilizing the substance to a vapor whereby the film is released from the surface. This method is performed in a microgravity environment. In this method the thick surface is a belt or drum which may be textured. The film is deposited by vapor deposition, sputtering, or chemical deposition and may comprise more than one layer. The volatilizable substance is a sublimable solid or an evaporable liquid. This method further includes the terminal step of recovering the vapor for reuse.

BRIEF DESCRIPTION OF THE DRAWINGS

FIG. 3 is a top view showing half of the rigging for the solar sail of the present invention.

FIG. 4 is a top view of an alternative embodiment of the present invention incorporating a tiltable panel for sail control.

BEST MODE FOR CARRYING OUT THE INVENTION

Figure 1:
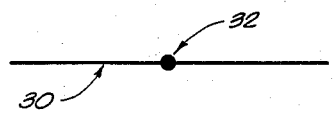
FIGS. 1A-H are cross-sectional views of various solar sail designs indicating the relationship of the payload to the sail surface under the embodiments of the present invention.
Figure 1:
Figure 1:
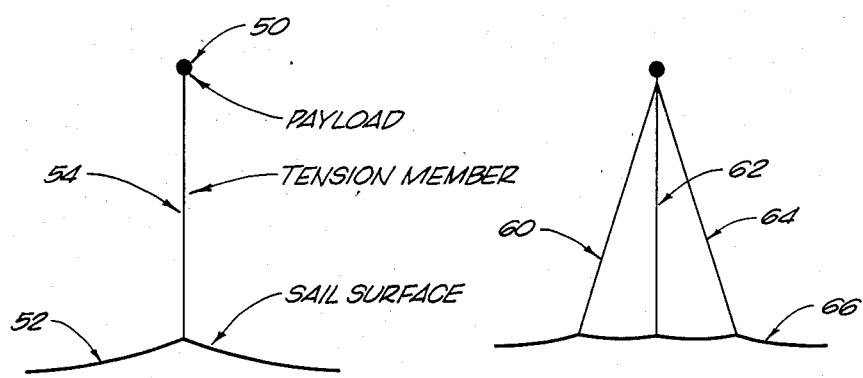
Figure 1:
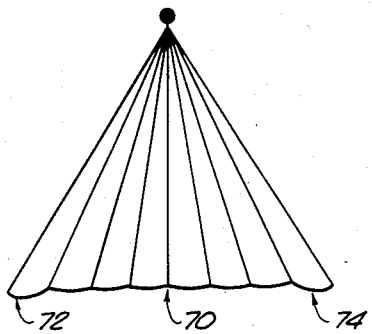
Figure 1:
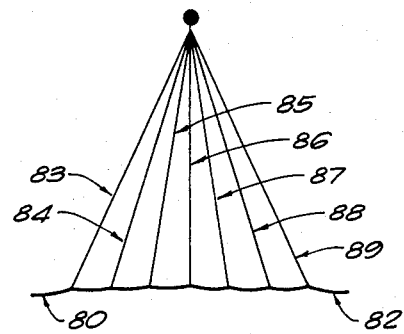
Figure 1:
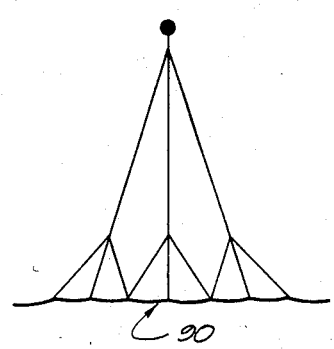
Figure 1:
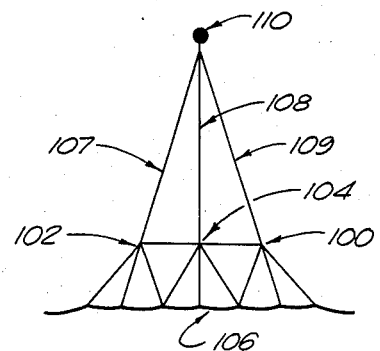

Referring to FIGS. 1A-H, there are shown a variety of solar sail systems in accordance with the present invention. In each of these illustrations of the solar sail systems, the solar sail surface is made up of a thin metal film.

The thin metal film, according to the preferred embodiment of this invention, is an aluminum film. Aluminum films have high reflectivity, low density, a reasonable melting point, and a very low vapor pressure. The reflectivity and transmissivity of aluminum film is a function of its thickness. Generally, reflectivity for short wave lengths falls off faster with decreasing film thickness than for longer wave lengths. Consequently, any aluminum film thick enough to reflect well in the visible wave lengths should reflect even better in the infrared, where roughly half the sun's power output lies. Even in the visible wave length, aluminum's reflectivity remains near its bulk value down to a thickness of 30 nm, and remains above 0.8 down to about 15 nm. The reflectivity of aluminum films varies with the deposition conditions. Over a range of at least 300 degrees to 473 degrees Kelvin, reflectivity increases with decreasing substrate temperatures. High deposition rates, near-normal vapor incidence, and a good vacuum favor high reflectivity. In general, poor deposition conditions reduce reflectivity with a shorter wave length more than for a longer wave length, and thicker films are more sensitive to vapor incidence angle than are thin films. Since most of the sun's power output is at comparatively long wave lengths, and since the films are to be quite thin, poor deposition conditions should not greatly affect sail performance.

Above some temperature, thin metal films fail by agglomeration. This occurs because thin films have an enormous ratio of surface to volume, permitting them to substantially reduce the surface energy by forming droplets. Above the melting point, the material rearranges swiftly, like a soap bubble bursting. At temperatures somewhat below the melting point, agglomeration into droplets occurs far more slowly, through surface diffusion. Thin films made from silver, with a melting point of 1235 degrees Kelvin agglomerate at less than 500 degrees Kelvin. However, the analogous temperature for aluminum is a mere 378 degrees Kelvin. Nevertheless, aluminum films have survived fifteen minute anneals at 673 degrees Kelvin, and two hour anneals at 700 degrees Kelvin. The reason for this discrepancy is the presence of an oxide layer on the aluminum, which armors the surface with a rigid, refractory skin, thereby inhibiting surface diffusion and preventing changes of shape.

Since the film is to be hot and mounted under tension, creep is of concern. The interior of a small droplet will be in compression, because of its surface energy and resulting force of surface tension. In like fashion, the interior of a thin film will be in compression, unless the mounting tension exceeds its surface tension. Considering the oxide-coated film, elongation not only breaks the oxide skin (which may be very strong), but also creates a fresh, uncoated aluminum surface. To shrink, on the other hand, it must somehow crush or destroy the outside surface, which it clearly cannot do. In fact, shrinkage would manifest itself as agglomeration, as discussed above.

The strength of a variety of thin metal films and thicker vapor deposited sheets have been measured experimentally. Metals in thin films have mechanical properties differing from those of the bulk material, because of the close proximity of all parts of the film to the surface. The yield and fracture stresses of aluminum film increase as the film gets thinner. Aluminum films show substantial ductility, and a variable degree of deformation before failure.

Aluminum films of the minimum thickness required for reflectivity may prove too weak to support the stresses imposed upon them during fabrication and operation, or may creep under load at elevated temperatures. If so, it is possible to strengthen them, not by adding further aluminum, but by adding a reinforcing film of a stronger, more refractory material. A good reinforcing film should be strong, light, and easy to deposit. It need not be chemically compatible with aluminum, since a few nanometers of some other material can serve as a barrier to diffusion. A reinforcing film is apt to have a high modulus such that it will act as the sole load bearing element in the composite film. The aluminum film could help contribute tear resistance, however. The use of a metal as a reinforcing film could reduce the amount of aluminum needed to give good reflectance. Some metals, such as nickle, may reflect well enough to be of interest by themselves.

Films of pure titanium from 150 to 2,000 nanometers thick were found to have strenghts of 460 to 620 NPa, while vapor deposited foils of Pi-6Al-4V from 40,000 to 2,000,000 nanometers thick had tensile strengths of 970 to 1200 NPa. Titanium has enough strength and temperature tolerance to make it an attractive choice as a reinforcing film. The strength of nickle film exceeds 2,000

NPa at a thickness of 70 namometers or less, dropping to 1500 NPa on annealing. Nickle's density is a disadvantage for use in sails of the highest performance, which should prove acceptable for bulk transport sails.

Silicon monoxide is a popular thin film material with many uses. On aluminum, these films have found extensive use as satellite thermal control coatings, and have demonstrated their stability in the space environment. Unbacked aluminum thin films with SiO coatings have been made for use in space. Mounted on fine metal meshes, unbacked SiO films as thin as 2.5 nanometers have found use as specimen supports in electron microscopy; such films are described as having "great strength," and are so stable at high temperatures that they may be cleaned by passing them rapidly through a flame. Since silicon monoxide is easy to evaporate, is refractory, has a low density, is apparently of high strength in extremely thin film form, and is of known space compatibility, silicon monoxide shows promise as a reinforcing film material.

Vapor deposited boron film has a strength of 620 MPa. Since it is light and refractory, boron may prove desirable as a reinforcing material. Carbon forms amorphous films of "exceptional strength;" those used in electron microscopy are made as thin as 4 nanometers. Since carbon is strong, light, refractory, and easy to deposit, it is a promising material for reinforcing film. For a wide variety of reasons, the sail surface will not be one big piece of film, but rather many smaller sheets mounted on a structure. Since the fabrication device, as described hereinafter, will produce strips, natural choices for the shapes of the sheet include long strips, shorter rectangles or squares cut from strips, and triangles cut from the strips. The sheets must be tensioned, and should be planar. Since a triangular sheet will be planed if tensioned at its corners, and since triangular sheets will fit well into a fully triangulated structure, they will be used as a basis for further design, as described hereinafter.

Tears are a critical concern in the use of thin films for solar sails. While even sheets of extremely thin material have adequate strength to support the load expected during fabrication and operation in the absence of stress concentrations, the inevitability of manufacturing flaws and micrometeoroid damage makes this a small comfort. A means of limiting the spread of tears would be desirable, as it would allow a thinner sheet to tolerate greater damage without failure.

The most obvious method of limiting tears is to mount the film on a supporting mesh. However, differing coefficients of thermal expansion and differing temperature between the mesh and the film are apt to make the film become slack and lose its flatness, or become taut and possibly tear. Further, the mesh adds mass to the sail and, because it must be fabricated, transported into space and attached to the film, adds cost as well.

A more natural approach to tear-stopping is to subdivide the film, convert it from a continuous sheet to a redundant network of small, load-bearing elements. In such a structure, a large manufacturing flow or a grazing micrometeoroid impact is free to initiate a tear—but the tear will cause the failure, not of an entire sheet, but of a small piece of film, perhaps 25 square milimeters in area. Patterns of cuts and wrinkles can de-tension areas of film to isolate stress to smaller regions. Each wrinkled region is fabricated with enough extra material to avoid being stretched flat as the film is tensioned. Stress isolation is aided by slits extending perpendicular to the boundary. The slits are terminated at their stress bearing ends in a way that avoids initiation of tears. This approach to tear resistance appears superior to that of mounting the films on a metal mesh. It involves the fabrication of no additional elements and the addition of no extra mass. By taking advantage of the natural strength of the films, it avoids slackness due to differential expansion and yields a flatter sail.

THE TRUSS STRUCTURE

FIG. 1 present a series of drawings of idealized solar sail designs. All of them represent cross-sections along the axis of the sail, with the thin metal film, the payload, and connecting tension members shown. As a matter of perspective, the drawings are oriented so that the force of light pressure is downward. The inertia of the payload may then be modeled as a fixed attachment point from which the sail is "hung." All tension members are assumed to have negligible mass, and the shape of the sail is then drawn as it would be under the effect of "gravity" and centrifugal force.

FIG. 1A illustrates the simplest case, in which the centrifugal force is very great compared to "gravity," making the sail 30 a taut, flat disc, "supported" at its center by the payload 32.

FIG. 1B illustrates the deformation of the sail for a small value of gravity. The center of the said 40 is "pulled up" into a conical mound, and the edge sags at an angle. In this drawing, the payload 42 is found at the center of the sail.

FIG. 1C illustrates that the payload 50 may be moved in front of the sail 52 and connected to the sail 52 by a tension member 54. This arrangement produces the same results as the arrangement illustrated in FIGS. 1A and 1B.

The sail designs of FIGS. 1A–C are not very flat and of strong stress concentration at their centers. This problem may be alleviated, as illustrated in FIG. 1D by adding tension members 60, 62 and 64 to support the sail sheet 66 at more points.

FIG. 1E shows this process continued, yielding a still flatter sail 70. As can be seen in FIG. 1E, the sail sheet 70 sags more at the edges 72 and 74, where the sheet's tension is low, than near the center, where it is high.

FIG. 1F shows how excessive sagging at the edge of the sail may be eliminated by leaving the edges as free-hanging flaps 80 and 82. The problem with the structure shown in FIG. 1F is that it suffers from an excess of long, nearly parallel tension numbers 83–89. Each of these tension members carries only a small load.

FIG. 1G shows how these tension members may be bundled together in front of the sail 90 into a lesser number of highly stressed members. FIG. 1H then shows how the nodes 100, 102, and 104, created by the bundling process may be linked to make a more rigid structure. As seen in FIG. 1H, the members 107, 108 and 109 from the payload 110 to the bundling nodes 100, 102, and 104 are called "shroud lines." The rest of the structure in front of the sail sheet 106 is called "rigging." Since the rigging is triangulated, and since all members remain in tension, the rigging may be considered as a rigid truss. The rigging and sail sheets may then be treated as a rigid body subjected to forces by light pressure and the shroud lines.

The design of the sail sheet structure uses a grid of tension members to carry the main structural load (primarily those of centrifugal force) in the sail sheet.

The sail may be built about a triangular grid. This kind of design has several attractive features. Its triangulation insures sheer resistence in the plane of the structure and minimizes the motion of nodes adjacent to tension members. Finally, the triangular appertures in the grid fit triangular patterns. If these are tensioned only at their corners, then they will automatically be free of imposed out-of-plane distortions. Its primary shortcoming lies in the high perimeter to area ratio of the trinagle. This triangular grid may be seen in greater detail in FIG. 4.

Figure 2:
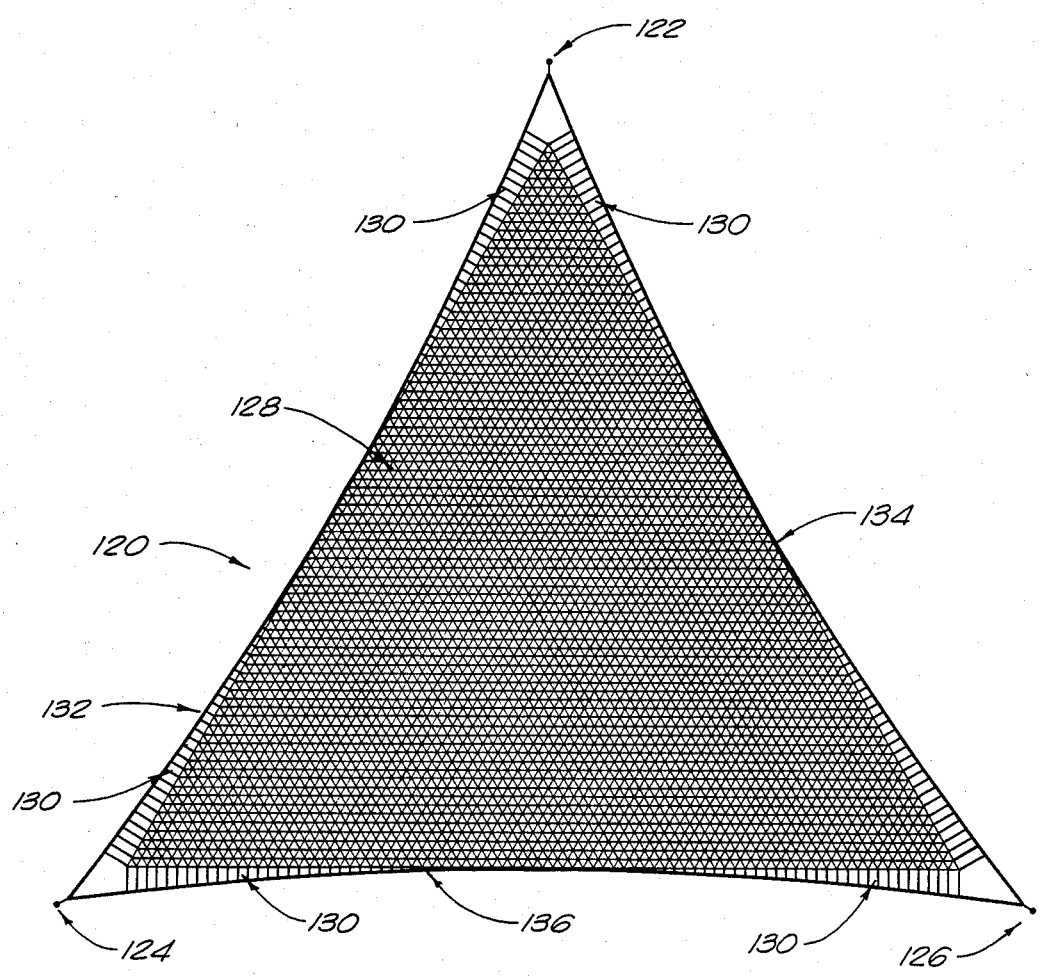
FIG. 2 is a view in side elevation of the triangular reflecting panel with catenary tensioning members according to the present invention.

In FIG. 2, in accordance with the aforementioned concepts, the sail panels 120 are triangles composed of triangular sheets of foil, tensioned by forces at their corners 122, 124, and 126. The triangular sheets are linked at their corners to form the reflecting area 128 of the panel 120. Springs may be used to insure reasonably smooth load distribution in the face of distortion. This reflecting area 128 is tensioned by ties 130 connected to catenary members 132, 134, and 136. The catenary members 132, 134, and 136 are in turn connected through springs at the corners 122, 124, and 126 of the panel 120 to the sail's structural grid as seen in FIG. 4.

The triangular panels 120 will deform under light pressure to an extent determined by their membrane stress. Solving for the exact deformation would be complex, since the catenary members 132, 134, and 136 deform as well. For preliminary design purposes, the panel deformation is of importance for two reasons: first, the degree of stress it causes affects the design of the spring linking the film triangle 128; and second, the changes in surface angle it causes affect the sail's performance.

As FIG. 1E indicates, the increasing membrane stress toward the center of the sail sheet 70 decreases the sag between the points of support provided by the rigging. This immediately suggests that the center needs fewer supports for a given area. FIG. 3 shows a cross section through a small sail 140 rigged to take advantage of this while maintaining tolerances on the sag angles. For larger sails the benefits are still greater, and additional levels of bundling may prove desirable near the edge. The rigging 142 occupies a volume resembling a truncated pyramid. The sides of the pyramid must be concave to maintain tension in the rigging's cross-members. Rigging numbers 142, not perpendicular to the sail sheet 144, will modify the tension in the sail sheet 144. This of little importance save near the edge of the sail, where the angle of intersection must be considerably greater than the flap 146 sag angle to avoid taking too much tension of the sheet 144.

The rigging's primary job is to concentrate the force of light pressure from the bottom of the rigging 142 and to transmit it to the top. The rigging adds about sixteen percent to the structural mass of the sail 140.

Independent of the mass of the film, the sail has components with a certain mass per unit area. This mass may be broken down into that of the foil springs which link the reflecting sheets, the tension structure making up the rest of each panel, the main tension structure of the sail, odds and ends at the nodes of the structure, and controls, actuators, and payload interface structure.

Clusters of coil springs link the corners of the foil triangles together. A graphite-polyimide material may be used in the primary tension structure of the sail. This material is selected for its high strength-to-density and modulous-to-density ratios, as well as the suitability for deployment and space use.

Links must be provided between the catenary cable and the corners of the film triangles at the edges of the reflecting panels. Since loads are extremely low, then 3.9 millimeter wide strips of one micron thick titanium foil may be used. Foil of this thickness has roughly 1,000 times the strength needed, and may be made by vapor deposition.

At the nodes in the main tension structure will be empty reels left over from the structure's deployment, some springs and possibly dampers, and a bit of connecting structure. The springs and dampers carry modest loads over modest distances. The control systems, actuators, and payload interface structure comprise the remaining non-film elements of the sail structure.

SAIL CONSTRUCTION

The strategy for near-term sail construction is to make and assemble as much of the sail as possible on earth. Thus, while the delicate films of the sail must be made in space, all other compenents are made on earth. The sail construction system consists of the following elements: a scaffolding (to control the structure's deployment), the film fabrication device (to be described hereinafter), a panel assembly device, and a "crane" for conveying panels to the installation sites.

The scaffolding structure rotates at a rate within the operational envelope of the sail itself, to facilitate the sail's release. Six compression members define the vertical edges of the hexagonal prism. Many tension members parallel to the base link these compression members to support them against centrifugal loads. Ballast masses flung further from the axis provide additional radial tension and rigidity near the top of the scaffolding. Other tension members triangulate the structure for added rigidity. Tension members span the base of the prism, supporting a node at its center. The interior is left open, providing a volume for deploying and assembling the sail. The top space is left open, providing an opening for removing it. The face of the sail is near the top of the scaffolding, and the rigging below. If the scaffolding is oriented properly, the sun will shine on the usual side of the sail, making it pull up on its attachment point at the base of the prism. The total thrust of the said is then an upper bound on the axial load supported by the compression members. It is clearly desirable to make the scaffolding a deployable structure.

The sail's structure consists of a regular grid of tension members, springs, and dampers, and a less regular three-dimensional network of rigging. This is a very complex object to assemble in space. Fortunately, even the structure for a sail much larger than described herein can be deposited in the Shuttle payload bay in deployable form.

Since the sail is a pure tension structure, its structural elements can be wound up on reels. Conceptually, the grid structure can be shrunk into a regular array of reels and a plane. With each node in the lid represented by housings containing three reels. The rigging can be sunken into a less regular array, and the nodes containing its reels stacked on top of those of the grid.

The structure will be deployed by pulling on cords attached to certain nodes. Deployment may be controlled by a friction brake in the hubs of the reels. By setting the brakes properly, positive tension must be applied for deployment and certain members may be made to deploy before others. Further control of the deployment sequence, if needed, may be introduced by a mechanism which prevents some elements from beginning to deploy until selected adjacent elements have finished deploying. If detailed external intervention is deemed desirable, brakes could be rigged to release when a wire on the housing is severed by laser pulse.

The film fabrication device, to be described in detail hereinafter, produces a steady stream of film triangles mounted to foil spring clusters at their corners. The panel fabrication device takes segments of the stream and conveys them along a track to assembly stations. Each segment is fastened to the previous segment and to the edge tension members that will frame the finished panel. This non-steady process of panel assembly requires a length of track to serve as a buffer with a steady film production process.

At the assembly station, the segments are transferred to fixtures with a lateral transport capability. During transfer, each segment is bonded to the one before along one edge. While the next segment is brought into position, the last segment is indexed over a one strip width, completing the cycle. Special devices bearing the edge tension members travel on tracts and place foil tabs on the panel structure. The foil tabs linking the segments may be bonded to one another in many ways, including ultrasonic welding, spot welding, and stapling. Attachment and conveyance may be integrated if the foil tabs are hooked over pins for conveyance. The panel assembly cycle ends with a pause, as the completed panels, now held only by their corners, are lured into a storage region and new edge members are loaded into position.

At this point the sail's structure is deployed within a scaffolding, and panels are being produced and stored at a panel fabrication module. The stored panels are initially loaded at a node suspended on tension members above the center of the sail. A crane is likewise suspended, but from tension members terminated in actively controlled reels mounted on devices free to move around the top of the scaffolding. This makes it possible to position the crane over any aperture in the grid.

Once panel installation is complete and the operation of various reels has been checked, the sail is ready for release and use. It is already spinning at a rate within its operational envelope, and is already under thrust, hence, this task is not difficult. First, the sail's path must be cleared. To do this, the film fabrication device, its power supply, the panel assembly device, and the crane are conveyed to the sides of the scaffolding in a balanced fashion. The top face is cleared of objects and tension members. Then, the members holding the corners of the sail are released, and the remaining restraint points are brought forward to carry the sail out of the scaffolding. Finally, all restraints are released, and the sail rises free.

SOLAR SAIL DYNAMICS AND CONTROL

There are eseentially two modes for operation and control of the solar sail. FIG. 4 serves to illustrates how control and maneuverability of the sail can be achieved.

In the first mode, the tilting of panels produces control forces. The panels 200 may be tilted as shown in FIG. 4. Small electric motors reel or unreel lines 101 and 204 on command, so as to move the panel corner 206 up or down while maintaining proper tension on it. Each panel has a mass of some 0.3 to 1.1 kilograms.

This first mode is conceived of as a semi-passive control mode for interplanetary cruising (where only slow changes of attitude are needed). It is of importance to consider the stability of a passive sail set at various angles to the sun. In the ideal sail approximation (planar, perfectly reflecting), thrust will be normal to the sail and act through its center of area, that is, along the axis of symmetry. In an absorbing sail, its thrust is divided into purely reflective and purely absorptive components. The former produces no torque, while the latter produces a torque. To counter this torque, light pressure must be increased on the far side of the sail from the sun relative to that on the near side. Making the sail concave toward the payload accomplishes this purpose.

Since torques can be balanced at all sail angles of interest, small perturbing torques can shift the sail from one attitude to another, or change its rotation rate. Since heliocentric orbit times are typically months, spin-up and spin-down times of ten days and precession rates of 0.1 radian/day seem reasonable targets. Tilting a panel by about twenty degrees changes the force on it—both normal to the sail and parallel to it—by about thirty percent of the panel's maximum thrust. Sail operation in this first mode configuration is characterized by torques that may be ballasted by a few statically positioned trim panels 100, permitting an entirely passive cruise mode. Slow changes in the sail's attitude and spin rate may be made, from time to time, by cyclic variation of panel tilt to produce perturbing torques. The passivity of cruise mode and the ease of providing redundant tiltable panels recommends this mode for reliable interpanetary transportation.

In the second mode of sail configuration, the payload mass is assumed to be large compared to the sail mass, and the sail is considered as a separate object linked to it by actively controlled shroud lines 202 and 204. In the second mode, the tilting of the panels 200 controls the spin rate. However, in this mode precession is effected by varying the tension exerted by the shrouds 202 and 204 on different parts of the sail. This is accomplished by reeling and unreeling the shrouds in a coordinated fashion as the sail turns. For the sail discussed above, and the probable range of sail performances, this arrangement implies precession rates of 13 to 26 rad/100 minutes, when the sail is flat with respect to the sun. This provides a generous margin in turn rate, even from maneuvers in low earth orbits. This active control permits damping of nutation. This is important, since nutation would otherwise be initiated by rapid changes in precession rate. It should be noted that during precession the payload is offset from the axis of rotation in a direction fixed in inertial space.

For missions involving both interplanetary cruise and circumplanetary maneuvering, a vehicle able to operate in both modes is desirable. The first mode has a decisive advantage near planets (because of its maneuverability), but cannot enter a passive cruise mode. The greater distance between the payload and sail in this mode precludes balancing the torque on the sail resulting from absorbed light with a reasonable amount of concavity, as is done in the first mode. Instead, the torque must be countered in the same manner as the sail is precessed: by active manipulation of shroud tension. While control of shroud tension might be made redundant by placing reels at both ends of the lines, reliability still favors a passive system on long missions. Fortunately, interconversion seems simple. The second mode control can be maintained as the shroud lines 202 and 204 are reeled in, so long as the sail is properly ballasted for mode one. While the payload reaches the mode one position, the reel can be locked and mode one control begun.

SUMMARY

The above described solar sail system is designed for high performance sails, large production rates, and low incremental production costs. These designed are suitable for heavy sail utilization. Attempts have been made within this preferred embodiment to optimize the design of solar sails so as to offer these qualities. The development of this thin film reflecting element in space appears to make feasible solar sails with twenty to eighty times the thrust-to-mass ratio of previously proposed, deployable, plastic-film sails.

The foregoing disclosure and description of the invention is illustrative and explanatory thereof, and various changes in the method steps as well as in the details of the illustrated apparatus may be made within the scope of the appended claims without departing from the spirit of the invention. The scope of the invention should be limited only by the following claims and their legal equivalents.

I claim:

1. A solar sail propulsion system comprising:

solar sail means for intercepting light pressure to produce thrust, said solar sail means being a thin metal film;

tension truss means having two ends attached at one end to said solar sail means for transferring said thrust from said solar sail and for preventing gross deformation of said solar sail under light pressure, said solar sail means being a plurality of separate generally two-dimensional pieces joined by springs to said tension truss means;

a payload attached to the other end of said tension truss means, said tension truss means comprising a plurality of attachment means for attaching shroud lines to the top of said tension truss means and a plurality of said shroud lines attached to said attachment means at one of their ends and said payload at the other;

a plurality of reel means attached to said shroud lines for controllably varying the length of said lines; and a plurality of reflective panel means attached to said sail means for controlling the orientation of said system.

2. A solar sail propulsion system as in claim 1 wherein said sail system is a disk attached to a truss built of tension structures, with catenary-edged panels installed in apertures in the disk structures.

* * * * *